Feb. 26, 1963 J. DUPLESSIS 3,078,539
CONCRETE PIPE MOULDING APPARATUS
Filed Feb. 1, 1960 5 Sheets-Sheet 2

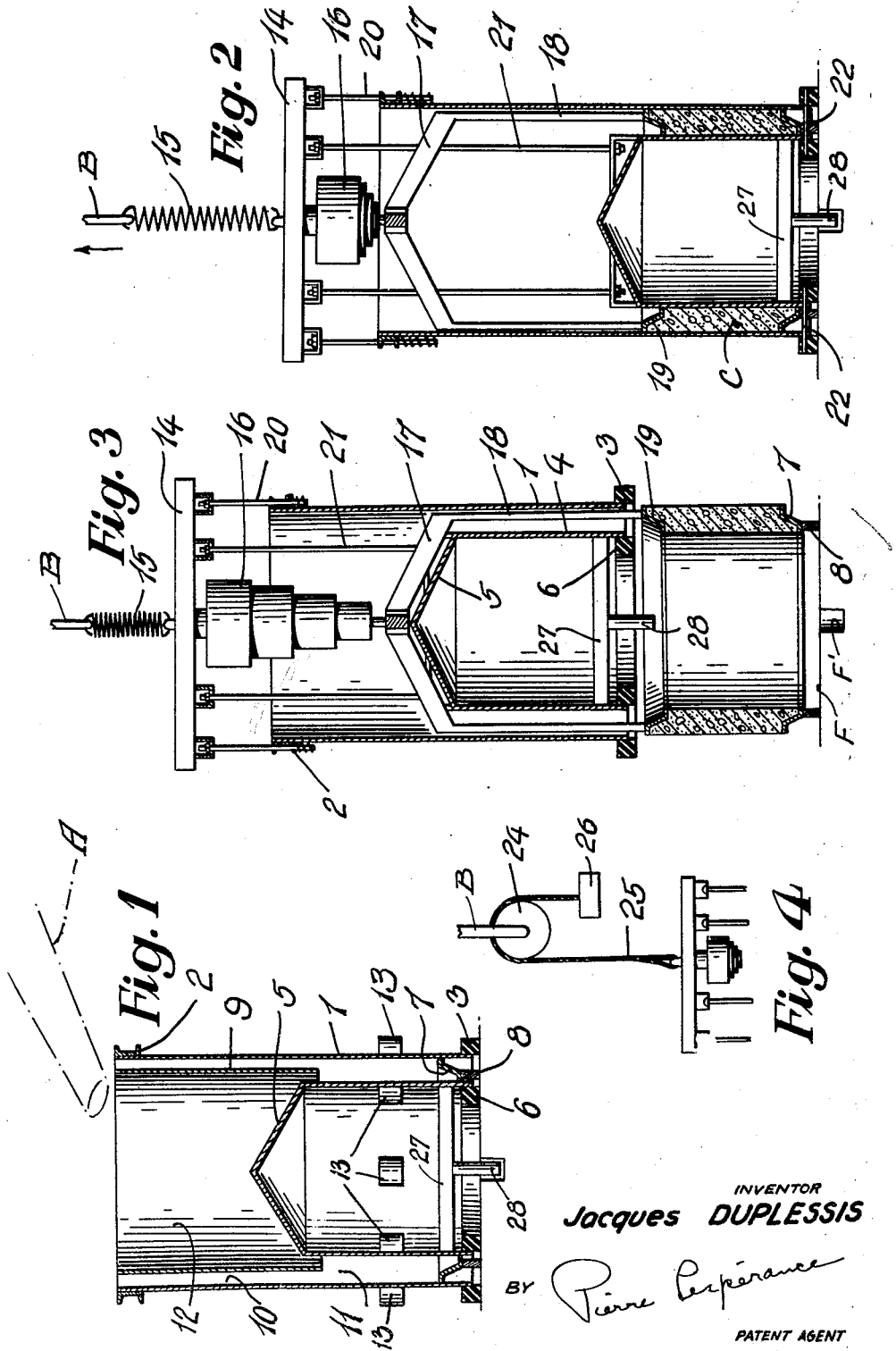

INVENTOR
Jacques DUPLESSIS
BY Pierre Lespérance
PATENT AGENT

INVENTOR
Jacques DUPLESSIS

BY Pierre Lespérance
PATENT AGENT

Feb. 26, 1963  J. DUPLESSIS  3,078,539
CONCRETE PIPE MOULDING APPARATUS
Filed Feb. 1, 1960  5 Sheets-Sheet 4
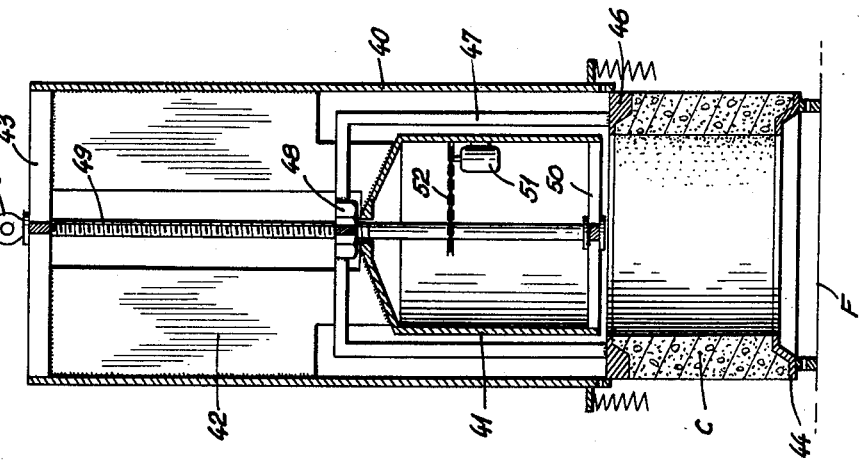
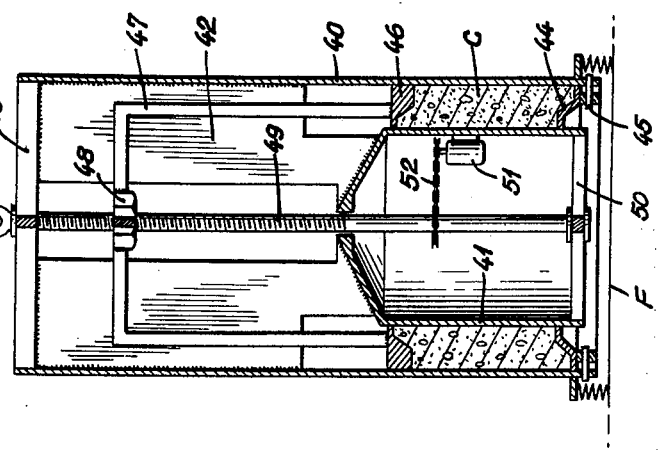
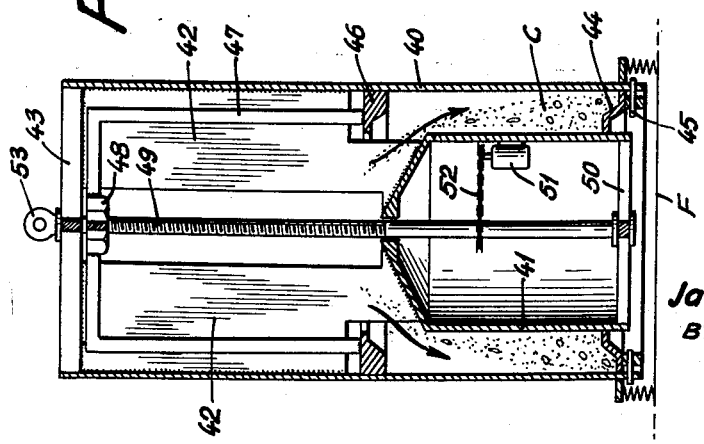
INVENTOR
Jacques DUPLESSIS
BY
Pierre Lespérance
PATENT AGENT Feb. 26, 1963 J. DUPLESSIS 3,078,539
CONCRETE PIPE MOULDING APPARATUS
Filed Feb. 1, 1960 5 Sheets-Sheet 5
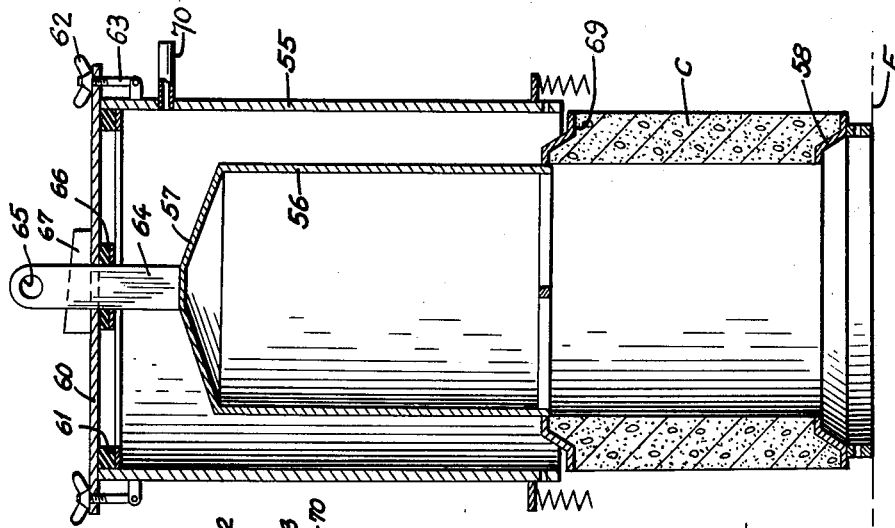
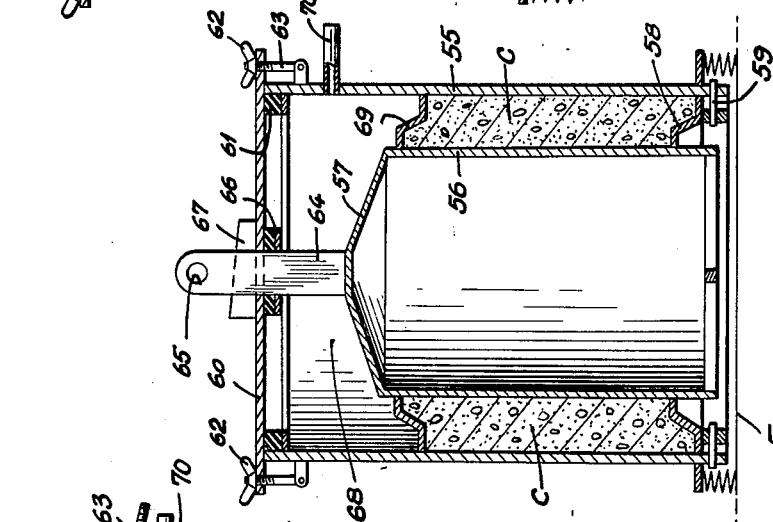
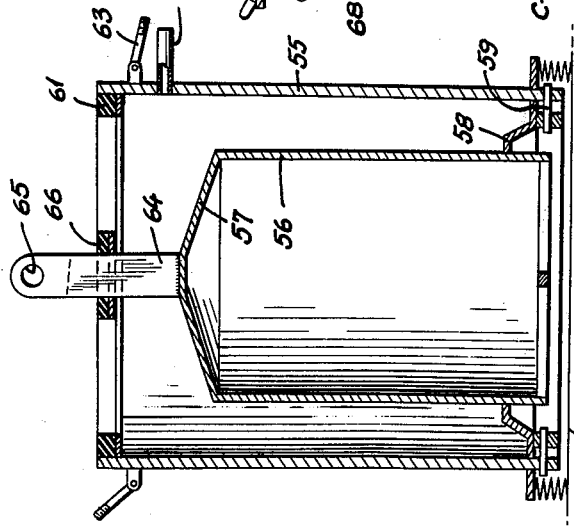
INVENTOR
Jacques DUPLESSIS
BY
Pierre Lespérance
PATENT AGENT

United States Patent Office 3,078,539
Patented Feb. 26, 1963

3,078,539
CONCRETE PIPE MOULDING APPARATUS
Jacques Duplessis, Montreal, Quebec, Canada, assignor to Compagnie Miron Ltée, Montreal, Quebec, Canada
Filed Feb. 1, 1960, Ser. No. 5,931
2 Claims. (Cl. 25—30)

The present invention relates to an apparatus for moulding pipes and more particularly concrete pipes of a large diameter such as those used for sewers, water conduits or the like.

An object of the present invention is the provision of an improved apparatus for moulding concrete pipes, which is of simple design and which can produce pipes of a considerably greater length than conventional apparatus of the same type.

Yet another important object of the present invention is the provision of a concrete pipe moulding apparatus of the character described which takes up a minimum of floor space and which allows the successive moulding of pipes with the same apparatus without displacing or otherwise moving the freshly moulded pipes so that the latter can be left to cure in place.

Yet another important object of the present invention is the provision of an apparatus of the character described the use of which enables a new pipe manufacturing method which avoids conventional curing chambers for the moulded articles.

Another important object of the present invention is the provision of an apparatus of the character described in which the inner and outer moulding shells are each made of a single section which are simultaneously removed from the moulded pipe in an automatic manner thereby avoiding the manual work usually involved in the stripping operation.

Another important object of the present invention is the provision of an apparatus of the character described which is adaptable for various diameters and lengths of concrete pipe.

Another important object of the present invention is the provision of an apparatus of the character described which is capable of producing more than one pipe at a time.

The foregoing and other important objects of the present invention will become more apparent during the following disclosure and by referring to the drawings in which:

FIGURE 1 is a sectional elevation of the outer and inner moulding shells and of the spout member used during pouring of the concrete into the mould;

FIGURE 2 is a longitudinal section of the mould and of the head gear used for compressing the poured concrete and for thereafter removing the mould from the moulded pipe;

FIGURE 3 is a sectional elevation of the same elements as in FIGURE 2 but shown in a position in which both the inner and outer moulding shells are being removed from the moulded concrete pipe;

FIGURE 4 is a partial elevation of a modified arrangement for attaching the head gear to an overhead crane or the like hoisting apparatus;

FIGURES 11, 12 and 13 are longitudinal sections of yet another embodiment of the invention, shown in three different stages of the moulding operation; and FIGURES 14, 15 and 16 are longitudinal sections of another embodiment of the invention showing three different stages of operation.

Figure 5:
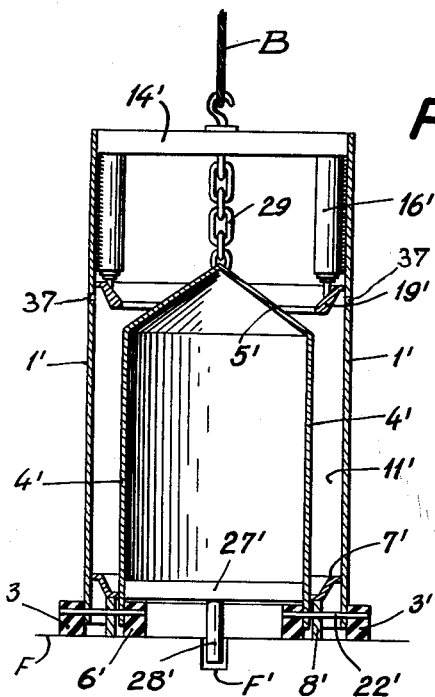
FIGURES 5, 6 and 7 are longitudinal sections at three different stages of operation of a modified embodiment in accordance with the present invention.

Referring now more particularly to the drawings in which like reference characters indicate like elements throughout, reference numeral 1 indicates an outer cylindrical shell open at its two ends and of any suitable length and defining the outer mould section. An annular collar 2 of channel-shaped cross-section is rigidly secured to the upper end of the outer shell 1. A ring 3 of resilient material, such as rubber or the like, is secured to the lower end of the shell 1 and projects downwardly therefrom and is adapted to rest directly on the ground and support the outer shell in a resilient manner. This ring 3 could be replaced by a series of coil springs.

The inner mould section consists of an inner cylindrical shell 4 open at its lower end and provided at its top end with a conical cap 5. The lower end of the inner shell 4 is also provided with a resilient ring 6 adapted to rest on the ground to resiliently support the inner shell 4 within the outer shell 1. The ring 6 can be replaced by coil springs. The annular space 11 defined between the two shells 1 and 4 is the moulding space for the concrete to be cast into a pipe.

A base moulding ring 7 is removably inserted within the moulding space 11 between the shells 1 and 4 in position near the lower ends of said shells. The base moulding ring 7 is supported on the ground by means of an annular frame 8 projecting downwardly therefrom and made of metal or of resilient material; the frame 8 could be replaced by spaced legs. The moulding ring 7 serves also to center the inner shell 4 with respect to the outer shell 1. The cross-section of the base ring 7 depends on the type of joints to be used for connecting the concrete pipes. In the embodiment described, the ring 7 will form a tongue adapted to engage a corresponding groove on the opposite end of an adjacent pipe. Obviously a concrete pipe with a bell and spigot joint can be produced in which case the bell end of the pipe would be produced by properly shaping the moulding base ring 7 and the lower end portion of the outer shell 1.

Prior to pouring of the concrete into moulding space 11, a cylindrical guiding member or pouring tube 9 is removably inserted within the top portion of the outer shell 1 and is supported by brackets (not shown) on the upper edge of the outer shell 1.

The lower end of the pouring tube 9 extends to a point opposite the upper portion of the cylindrical inner shell 4 and has a diameter smaller than the outer shell 1 such as to leave an annular air passage 10 for escape of the air from moulding space 11 during pouring of the concrete.

A predetermined quantity of concrete is poured at once into the interior of tube 9 over the conical cap 5 of the inner shell 4, the reserve space 12 being made of sufficient volume to accommodate the total quantity of concrete required for the moulding of one concrete pipe; thus once the required quantity of concrete has been poured into the reserve space 12 the spout A can be removed and the concrete supply used for another mould, without waiting for the concrete to drop into moulding space 11.

Vibrators 13 of any known suitable design, which were previously attached either to the inner surface of the cylindrical shell 4 or to the outer surface of the outer shell 1, or to both of them, are used to vibrate the two shells thereby causing the concrete to flow from the reserve space 12 into the moulding space 11, onto the base ring 7. Air is allowed to escape through the annular space 10. If desired, steel reinforcement may have been initially located in the moulding space 11. The inner shell 4 is preferably provided with a cross member 27 having a downwardly extending rigid center pin 28 adapted to enter a hole F' made in floor F and thus prevent undue displacement of the apparatus during vibration of the concrete.

Once the plastic concrete has been properly compacted within the moulding zone, the pouring tube 9 is pulled upwardly and entirely removed from the mould.

Then, the arrangement shown in FIGURE 2 is brought into position; this arrangement comprises a beam 14 preferably in the form of a cross suspended from a cable B through the intermediary of a heavy coil spring 15.

A telescopic fluid operated power cylinder and piston unit 16, which can be replaced by an ordinary unit, has one end secured underneath the centre of the beam 14 and its piston rod rigidly secured to the top central portion of a fork like element or spider 17 providing three or more equally angularly spaced legs 18 parallel to each other and of equal length and to the lower end of which is permanently or removably secured a top moulding ring 19 the cross-sectional shape of which depends as the base ring 7 on the particular type of joint desired; the sectional shape of the top ring 19 illustrated in the drawings is for making a groove adapted to complement the tongue formed at the opposite end of the pipe.

Tie rods 20 and 21 are suspended from the cross beam 14 and are removably connected at their lower ends to the outer shell 1 and to the top of the inner shell 4 respectively.

Shear pins 22 are adapted to be removably inserted into aligned holes made in the lower ends of the shells 1 and 4 below the base ring 7 at suitable points along the periphery of the shells.

The cable B is a part of a suitable overhead hoisting apparatus such as a chain block, a travelling crane or the like.

Once the overhead hoisting apparatus has been brought into position and connected to the inner and outer shells as shown in FIGURE 2, with the top moulding ring 19 in position over the top of the concrete C already in the moulding space 11, the power cylinder and piston unit 16 is actuated, the vibrators 13 being stopped or still in operation, to thereby exert compression on the plastic concrete C between the two moulding rings, thus forming the top end of the pipe immediately under the top ring and assuring moreover a better compaction of the whole mass of concrete. It will be noted that during the pressure stroke of the power unit 16, the legs 18 of the spider 17 come under compression while the tie rods 20 and 21 come under tension and urge the base ring 7 upwardly against the concrete through the intermediary of the inner and outer shells and the shear pins 22, said pins abutting against the base ring 7.

Once the concrete C has been properly vibrated and compressed so as to form a compact moulded mass as free as possible of any air spaces or voids, the power unit 16 is deenergised and the shear pins 22 are removed for the subsequent stripping of the moulded pipe.

The extension coil spring 15 is preferably calibrated so as not to extend or to extend only slightly under the dead weight of the apparatus including the moulding sections 1 and 4, the beam 14 and the cylinder and piston unit 16.

The stripping operation is effected as follows. The hoisting device, not shown, is actuated to pull the cable B until the spring 15 is substantially fully extended as shown in FIGURE 2, then the hoisting device is stopped and the operator energizes the power unit 16 in a controlled manner such that said pressure unit will at any instant during the stripping operation, exert a pressure on beam 14 at least sufficient to overcome the friction resulting from the upward movement of the shells 1 and 4 with respect to the stationary concrete C. As the dead weight of the apparatus is constantly counteracted by the spring 15, the power unit 16 will exercise a downward reactive pressure on the top moulding ring 19, equivalent to the pressure on beam 14 as mentioned above; thus no or very little downward pressure will be exerted on the freshly moulded concrete and the latter will not collapse. When the concrete mass C has been completely unstripped the device is in the position shown in FIGURE 3 in which the lower ends of the outer shell 1 and inner shell 4 clear the top ring 19, the inner shell 4 occupying the space between the legs 18 of the spider 17.

In this position the top moulding ring 19 can be immediately removed from the top edge of the cast pipe or left in position and detached from the spider 17 thereby releasing in either case, the apparatus for immediate use at another moulding location.

Although a spring 15 has been described, it may be deemed preferable to replace the same by a counter weight arrangement as shown in FIGURE 4. A pulley 24 is attached to the cable B and an auxiliary cable 25 is trained over the pulley 24 and attached at one end to the beam 14 and at the other end to a counter weight 26, the weight of which is slightly in excess of the dead weight of the arrangement of FIGURE 2, except for spider 17 and ring 19, but including the concrete mass C. With the counter weight system of FIGURE 4 the stripping operation is effected by first operating the hoisting device, such as to lift the pulley 24 until the counter weight 26 reaches its uppermost position. The hoisting device is then stopped and the operator regulates admission of power fluid to the power unit 16 in accordance with the rate of upward movement of the outer and inner shells 1 and 4. Thus, as in the first case during the entire stripping operation the downward pressure exerted on the top moulding ring 19 and consequently on the moulded concrete C will be substantially equal to the frictional force developed during unstripping between the moulding shelf and the concrete C.

Obviously, the calibration of the spring 15 or the weight of the counterweight 26 must be such that there will at no time be a lifting force exerted on the whole apparatus, which would lift the cast pipe off the floor. When spring 15 is used, the latter must have a sufficient amount of elongation so as to take care of the movement of the moulding shelf during unstripping.

The top moulding ring 19 is preferably left in place for a predetermined time after the concrete has been poured. Once the mould has been removed, the concrete C is left exactly in the position where it was moulded, for curing. For this purpose a canvas or plastic tent or bag, not shown, is disposed over the concrete pipe C to form an individual curing room in which steam may be fed if desired in order to accelerate the rate of curing.

From the foregoing description it will be apparent that concrete pipes of any suitable diameter can be moulded with the apparatus of the present invention. Also, the only limit to the maximum length of concrete pipe to be cast depends on the height of a freshly moulded concrete mass which can stand on edge without collapsing. It will also be understood that several pipes can be cast at once with a slightly modified apparatus embodying the same principles of the present invention, for instance a plurality of outer shells may be disposed side by side and rigidly secured to one another to form a rigid unit adapted to be detachably connected by tie rods 20 to the cross beam 14, and a corresponding number of inner shells may be rigidly interconnected at their top portion and arranged to fit within the respective outer shells. The assembly of inner shells would be attached to the tie rods 21 which are in turn connected to the cross beam 14. Finally, separate base rings 7 would be inserted within the moulding space of each individual outer and inner shell arrangement, while all the top rings would be arranged for connection to a suitably modified spider, itself suspended from the power unit 16; thus the output rate of the apparatus of the present invention can be increased especially when manufacturing pipes of relatively small diameter, such as 12 inch and 30 inch pipes.

Due to the fact that the apparatus of the present invention provides for the vibration and also the compression of the concrete between the two rings 7 and 19, it has been found that it is possible to manufacture thin wall concrete pipes of, for example, 72 inches in diameter and 10 feet in length and even more.

It will be noted that the hoisting device, such as a chain block or travelling crane, which is used for suspending the apparatus illustrated in FIGURES 2 and 3 by means of cable B may be also used for handling the spout A or bucket for the pouring of concrete, the pouring tube 9 and the reinforcing armature for the pipe.

It will be seen that the apparatus in accordance with the present invention enables the moulding of concrete pipes, the stripping of the moulds and the curing of the cast pipe in one position, thus the freshly moulded concrete does not have to be displaced or moved until fully cured.

The apparatus of the present invention is relatively inexpensive to manufacture, is of simple design and is so arranged that the power unit 16 serves both for the compression of the concrete within the moulding zone and during the stripping operation. Obviously, the power unit 16, which has been illustrated as being a hydraulic unit could be replaced by any other power means for exerting opposed pressures between the beam 14 and the spider 17.

Figure 7:
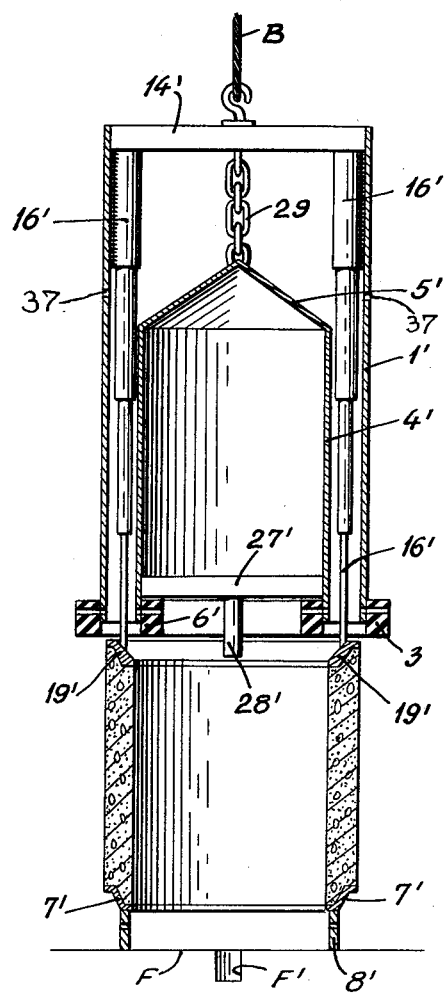
Figure 6:
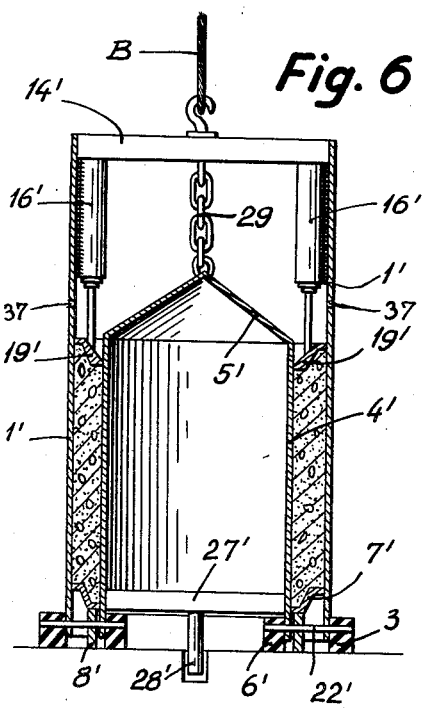

FIGURES 5, 6 and 7 show another embodiment of the present invention which is characterized by the fact that it requires less vertical room than the first embodiment. The centrally mounted cylinder and piston unit 16 of the first embodiment is replaced by a plurality of laterally mounted units 16' thereby avoiding the necessity of a spider 17.

The inner mould section 4' has a conical cap 5', a cross member 27' and a pin 28' as in the first embodiment, and is connected to cross beam 14' by a central chain 29 which replaces tie rods 21 of the first embodiment. Inner mould section 4' is supported on the floor F by resilient means such as resilient ring 6', similar to ring 6, the outer mould section 1' can be directly connected to beam 14' at its upper edge and is provided at its lower edge with resilient ring 3'. Beam 14' is directly hooked to cable B, the top moulding ring 19' is secured to and suspended from the piston rods of the units 16'; the latter are preferably of the telescopic type with the outermost cylinder secured to cross beam 14' and also preferably to the inner side wall of the top portion of outer mould section 1'. Preferably there will be at least three telescopic power units 16' equally angularly spaced. The base moulding ring 7' has support legs 8' and can be clamped with respect to inner and outer mould sections 4' and 1' by means of shear pins 22' which are removable and are similar to shear pins 22 of the first embodiment. During pouring of the concrete into the moulding space 11', top moulding ring 19, is in elevated position to clear cap 5', as shown in FIGURE 5. The concrete is vibrated during pouring by means of vibrators such as shown at 13 in FIGURE 1 or preferably by a vibrating arrangement which will be described thereafter in relation to the embodiment shown in FIGURES 8 and 10. Once the predetermined quantity of concrete has been poured, extension units 16' are actuated whereby top moulding ring 19' compresses the concrete as shown in FIGURE 6 to form the top end of the pipe and to insure good compaction of the whole concrete mass. Then the shear pins 22' are removed and the hoisting cable B is pulled upwardly to effect the stripping operation which consists in lifting the two moulding sections 1' and 4' while simultaneously controlling the extension of units 16' in such a manner as to exert sufficient downward pressure on the moulded mass of concrete to prevent lifting of said mass; the top moulding ring 19' can be left in place or removed together with the apparatus which can immediately be used for the moulding of another pipe at another location. The freshly cast pipe is left to cure in a plastic bag or the like as in the first embodiment.

Figure 8:
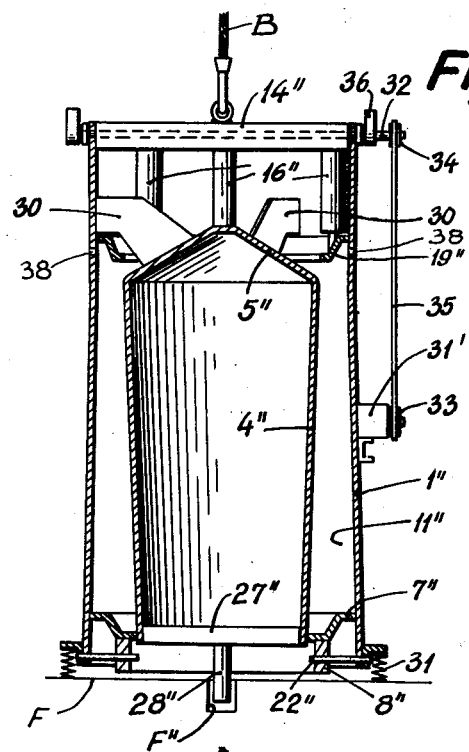
FIGURES 8, 9 and 10 are longitudinal sections of still another embodiment of the present invention showing three different stages of molding operation.
Figure 10:
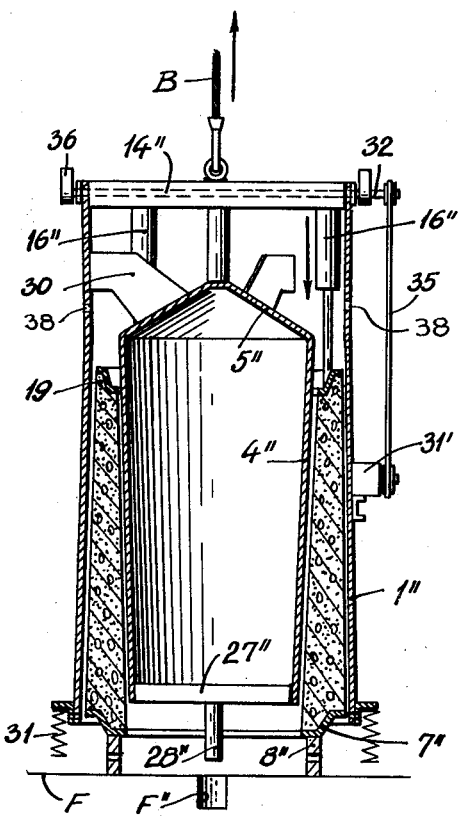
Figure 9:
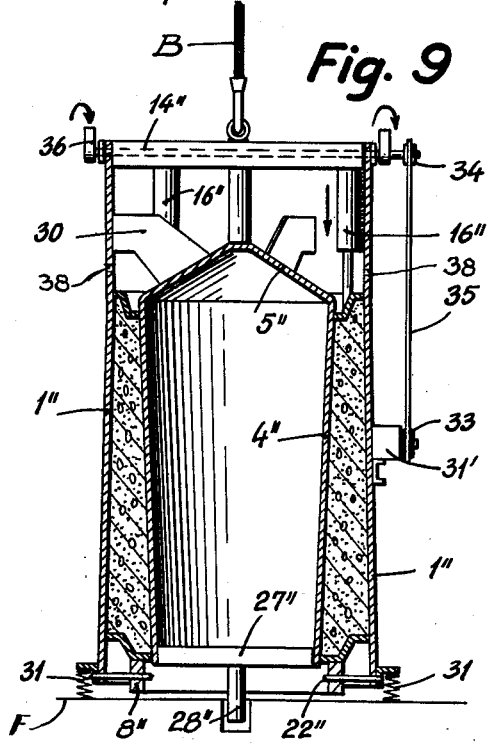

FIGURES 8 to 10 inclusive illustrate still another embodiment of the present invention which is based on the fact that in practice designs specification for large diameter concrete pipes allow relatively wide tolerances in the diameter of the pipe and thus, tapered pipes within certain limits are found acceptable. In the drawings, the taper of the pipe has been greatly exaggerated to illustrate the invention in a clearer manner. The third embodiment is preferred to the first two described hereinabove due to the smaller vertical space required for use of the same and also to the fact that simpler hydraulic power units are required.

The inner mould section 4" is downwardly tapered having a smaller diameter at its base than at its top portion. Mould section 4" is provided with the usual conical cap 5" and is rigidly secured to the outer mould section 1" by means of at least three radially extending arms 30 which maintain mould section 4" in centered position with respect to mould section 1". The outer mould section 1" is tapered upwardly having a larger diameter at its base portion than at its top portion. The cross beam 14" is directly secured to outer mould section 1" and a top moulding ring 19" is secured to the lower end of extensible power units 16" which are secured to cross beam 14" and also preferably to the inside of mould section 1". The assembly of the two mould sections is resiliently supported on the floor F by means of coil springs 31. Inner mould section 4" is preferably provided with cross member 27" supporting pin 28" engaging a hole F' made in floor F.

The base moulding ring 7" is provided with legs 8" which are normally spaced upwardly from floor F when the base moulding ring is secured against relative movement with respect to mould sections 1" and 4" by means of shear pins 22".

The two embodiments of FIGURES 5 to 10 inclusive allow the use of a vibrator apparatus shown in FIGURES 8 to 10 instead of the vibrators 13 used in the first embodiment. This vibrator apparatus may comprise a motor and speed reducing unit 31 mounted on the side of mould 1" and driving a shaft 32 through pulleys 33, 34 and belt 35. The shaft 32 is journaled in suitable bearings supported by cross beam 14" and extends across the top of the entire apparatus. Shaft 32 bears eccentric masses 36 which are rotated at high speed to vibrate the whole apparatus.

In use, the top moulding ring 19" is first in upper limit position to clear the top 5" and allow pouring of the concrete within the moulding space 11", the base moulding ring 7" being in position and retained by shear pins 22". The poured concrete is then compressed as shown in FIGURE 9 by means of top moulding ring 19' and units 16", then pressure is released and the shear pins 22" are removed. Pressure is again exerted by units 16" which cause downward movement of the concrete mass until legs 8" abut floor F and cable B is pulled upwardly and after a short lifting movement of the two moulding sections 1" and 4" by cable B, the concrete mass is entirely out of contact with said moulding sections as shown in FIGURE 10 and the entire apparatus can then be further lifted together with the top moulding ring without having to make extension units 16" with a long effective stroke as in the second embodiment.

The two embodiments of FIGURES 5 to 10 are preferably provided with venting openings 37 and 38 made in outer mould sections 1' and 1" at the level of the top moulding rings 19' and 19" when said moulding rings are in elevated position. Thus air from the pouring spaces 11' and 11" will escape through said venting openings during pouring of the concrete.

The embodiment shown in FIGURES 11, 12 and 13, shows an arrangement wherein the hydraulic cylinder and piston units of the previous embodiments have been replaced by mechanical power means. In this embodiment, the outer mould section 40 and the inner mould section 41 are both of cylindrical shape and uniform cross-section and are rigidly interconnected by web plates 42 and a cross-member 43 in the form of a cross rigidly secured at the top end of the outer mould section 40, the latter being longer than section 41. The base shaping end or moulding ring 44 is adapted to be disposed between the two mould sections at the lower end thereof, and to be removably secured to the outer mould section by means of shear pins 45. The top moulding ring 46 is rigidly secured to the lower end of a spider 47 which is in turn secured at its top central portion to a nut 48 in threaded engagement with a screw 49 vertically extending centrally of the apparatus and journaled at its ends in the top cross-member 43 and in a second cross-member 50 secured to and extending within the inner mould section 41. A suitable electric motor and speed reducing unit 51 drives the screw 49 by a transmission chain 52. Motor 51 may be secured to the inside of inner mould section 41.

FIGURE 11 shows the nut, spider and top ring in elevated position for filling the moulding space with cement material. Once the molding space is filled, motor 51 is operated to lower the top moulding ring 46 and compress the cement material C within the moulding space, against the bottom moulding ring 44 which is locked by shear pins 45. Then, the shear pins 45 are removed, the motor 51 is operated and the whole assembly pulled upwardly by means of a hoisting cable (not shown) attached to eye 53 which is secured to the center of cross-member 43. Thus, the cast cement C is stripped as shown in FIGURE 13, the casting resting on the base ring 44 which in turn rests on floor F.

FIGURES 13, 15 and 16 show a simplified embodiment in which compressed air is used for compressing the cement and stripping the same. The outer mould section 55 is of cylindrical shape and longer than the inner mould section 56 which has an imperforate top 57. Base ring 58 is adapted to be removably secured by shear pins 59 to the outer mould section. The upper opened end of the outer mould section 55 is adapted to be closed in fluid tight manner by means of a cover disk 60 which seats on gaskets 61 secured to the outer mould section. Cover 60 is firmly retained in closed position by means such as the wing nuts 62 engaging pivoted bolts 63 passing through marginal notches made in the cover disk 60.

The inner mould section 56 is provided with an upstanding bar 64 rigidly secured to the top 57 thereof and passing through an opening made in cover 60 and projecting upwardly of said cover being provided with eye 65 for attachment of pulling means, such as a hook and cable forming part of hoisting means (not shown). A gasket 66 secured to the bar 64 effects a fluid tight joint between the bar and the cover disk 60. A wedge 67 engaging the cover 60 and passing through an opening made in the bar 64 assists in effecting the fluid tight closure.

Thus, a fluid tight space 68 is defined within the upper part of the outer mould section and above the top ring 69 and top 57. The outer mould section 55 has a port or pipe 70 in communication therewith and adapted to be connected to a source of compressed air.

FIGURE 14 shows the apparatus in condition ready for filling with cement material, the cover 60 being removed. Once the cement C has been poured into the moulding space, the top moulding ring 69 is disposed on top of the cement and the outer mould is closed with the cover 60 by means of nuts 62 and wedge 67. Compressed air is then admitted within space 68 to first effect compression of the cement C and after removal of shear pins 59, the assembly of the mould sections and cover 60 is then pulled upwardly through eye 65 while maintaining the air pressure within space 68 to thereby effect stripping of the cast cement as shown in FIGURE 16.

While preferred embodiments in accordance with the present invention have been illustrated and described it is understood that various modifications may be resorted to without departing from the spirit and scope of the appended claims.

What I claim is:

1. An apparatus for making hollow concrete articles, comprising one piece tubular inner and outer mould sections disposed upright and nested one within the other for defining a moulding space therebetween, said inner mould section being closed at the top, said outer mold section projecting upwardly from the top of said inner mould section, a cover removably closing the top of said outer mould section in fluid tight manner, a vertical bar removably and rigidly interconnecting said cover and said inner mould section, projecting upwardly through an opening made in said cover, and making a fluid tight seal therewith, upper and lower shaping ends for said moulding space, means removably locking said outer mould section and said lower shaping end against relative movement, pulling means attached to the upper end of said bar, and a port in communication with the space defined by said cover, the upper projecting portion of said outer mold, the top of said inner mould section and said upper shaping end for admitting compressed air within said space.

2. An apparatus as claimed in claim 1, wherein said bar is rigidly secured to the top of said inner mold section.

References Cited in the file of this patent

UNITED STATES PATENTS

| | | |
|---|---|---|
| 2,091,385 | Trickey | Aug. 31, 1937 |
| 2,165,671 | Ward | July 11, 1939 |
| 2,185,597 | Klemschofski | Jan. 2, 1940 |
| 2,274,236 | Hopkins | Feb. 24, 1942 |
| 2,495,100 | Henderson | Jan. 17, 1950 |
| 2,616,146 | Haase | Nov. 4, 1952 |
| 2,805,462 | Chandler et al. | Sept. 10, 1957 |
| 2,870,513 | Gagne | Jan. 27, 1959 |
| 2,926,411 | Steiro | Mar. 1, 1960 |
| 2,937,421 | Taccone | May 24, 1960 |
| 2,948,044 | Dawson | Aug. 9, 1960 |

FOREIGN PATENTS

| | | |
|---|---|---|
| 525,320 | Belgium | June 15, 1954 |
| 812,011 | France | Jan. 27, 1937 |
| 800,521 | Great Britain | Aug. 27, 1955 |
| 132,861 | Sweden | Sept. 4, 1951 |
| 163,271 | Sweden | May 13, 1958 |